Oct. 4, 1966     A. D. STRUBLE, JR     3,277,479

PASSIVE COMMUNICATIONS SATELLITE

Filed Sept. 25, 1963

3,277,479
PASSIVE COMMUNICATIONS SATELLITE
Arthur D. Struble, Jr., 1754 S. Crenshaw Blvd.,
Torrance, Calif.
Filed Sept. 25, 1963, Ser. No. 311,413
8 Claims. (Cl. 343—18)

This invention generally relates to a novel satellite construction and more particularly to an improved passive communications satellite.

ECHO passive communications satellites of the solid sphere type are well known but have raised many problems which have stood in the way of achieving a really effective worldwide passive communications system. These problems were to be expected in initially dealing with the new and strange environment of outer space. A listing of these problems would inculde:

(1) Relatively large weight;
(2) Inflation difficulties;
(3) Short effective life;
(4) Poor electromagnetic properties if partially deflated;
(5) Orbit perturbations due to solar winds and aerodynamic drag;
(6) Film memory problems;
(7) Susceptability to damage by micrometeorites and meteorites; and
(8) Danger from over pressures in the event a large megaton blast was produced in space, even though the blast is thousands of miles away.

Many disadvantages of solid inflated passive communications satellites (Echo II) can be overcome with the use of an open, geodesic array of tubular, aluminum braided modules in accordance with this invention. A 405-foot diameter spherical satellite fabricated from such modules has many attractive features.

The advantages of such a satellite are:

(a) A weight advantage: a 405-foot diameter open network sphere can weigh less than a 135-foot diameter solid satellite;

(b) A gas advantage: the inflation gas required is approximately four orders of magnitude less than that of a solid sphere, which would mean fewer inflating problems as well as high pressure capability;

(c) A reliability advantage: once all the braided aluminum modules are stressed past yield, no further pressure requirements exist for the life of the satellite;

(d) A radiation pressure advantage: solar radiation presure, earth radiation pressure, and earth reflected solar radiation pressure should not affect the geodesic satellite in comparison to a solid sphere passive satellite;

(e) Aerodynamic drag advantage: the open network design and small effective surface area would decrease aerodynamic drag problems markedly;

(f) An ephemeris advantage: the decreased forces on the satellite will result in less perturbations to the trajectory and thus insure improved tracking capability;

(g) An electromagnetic reflectivity advantage: the increased size of 405-foot enables a theoretical 10 db gain over a 135-foot solid satellite;

(h) An environmental advantage: the heat balance, surface tension weave opening of the satellite eliminates continual pressurization requirements, ultraviolet sensitivity and film memory problems; only the braided aluminum tape will be required to withstand the environments of space;

(i) A hazards of space advantage: a geodesic design would have orders of magnitude less probability of damage from micrometeorites, meteroids and/or pressure pulses from nuclear tests in space;

(j) A long life advantage: because of the above advantages, a geodesic satellite would be expected to have much longer effective life than a solid, inflated satellite;

(k) Reliability: redundance of the design is expected to allow module failures without satellite failure and positive retention of design shape through a "stabilized shell" having a major thickness dimension;

(l) The option of isotropic or non-isotropic design.

Considered from one aspect, the present invention comprises a passive satellite unit which (at least initially) contains a plurality of interconnected elongated modules in the form of a generally open network array, each of said modules being generally tubular in cross section and having walls of inflatable plastic material, the walls acting as carriers for arranged metallic elements.

The invention will be better understood after reading the following description in conjunction with the attached drawings, wherein.

The exact size and shape of the individual modules 10 are not critical. A module six feet long and one inch in diameter is an example of a suitable size for some purposes.

Each module is designed to be inflated during all or a part of its useful life. Inflation could be effected either with a gaseous material or with any of the sublimating materials 14 that are currently known and used in the space program. Inflating gas requirements would be minimal compared with a solid surface satellite sphere.

The plastic walls of the modules may be strengthened with fiber glass, metallic threads or strands, etc. In copending application Serial No. 128,799 entitled Balloon Envelope Structure and filed August 2, 1961 by the present inventor there is described a lightweight reinforced plastice material which is particularly suitable for this purpose. Plastic film (such as polyethylene) of very small thickness ($\frac{1}{10}$ or $\frac{1}{5}$ mil) is preferred.

Figure 4:
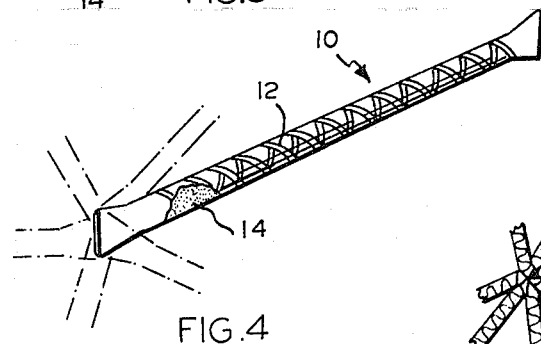
FIGURE 4 is a view illustrating interconnected modules.

When the basic module units 10 are sealed so that they will have a gas-tight interior, they can be interconnected (preferably at their ends) to form open network structure of almost any size and shape (see FIGURE 4).

The plastic walls of the modules have attached thereto or embedded therein metallic elements 12 which will improve the communication characteristics (reflective capability) of the satellite. Metallic elements such as braided aluminum wires or tapes are preferred. Such metallic elements may serve the added function of lending strength when added strength is necessary. The aluminum wires and tapes can be of varying strength and sizes, a preferred wire diameter being 3 mils and a preferred tape being 5 mils wide and $\frac{1}{3}$ mil thick. The aluminum is subsequently elongated beyond its yield strength by the inflation gas, thereby giving the aluminum or wires braid a permanent set in space. An inflated tube generally has double the stress in the circumferential direction that it has in the longitudinal direction. As a result, in order to balance these stresses with a strengthening member, the strengthening member should have the same ratio of stresses. The braid design is preferably configured with a 2:1 orientation so that the stress equilibrium point of the aluminum array balances the longitudinal and circumferential stresses.

Figure 3:
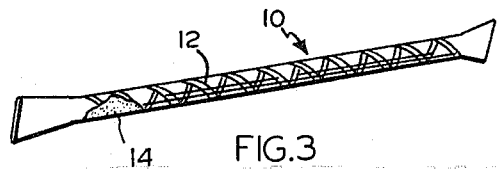
FIGURE 3 is a perspective view of a module in accordance with this invention.
Figure 1:
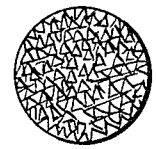
FIGURE 1 is a perspective view of a satellite constructed in accordance with this invention.
Figure 2:
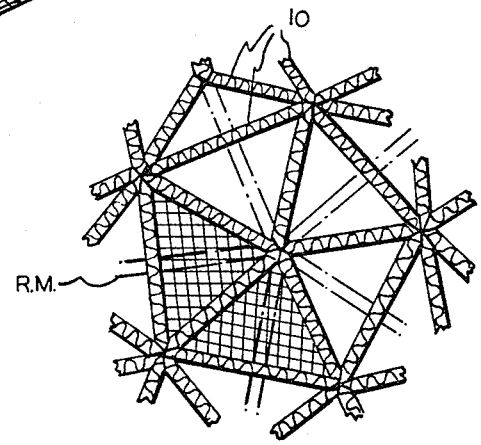
FIGURE 2 is an enlarged view of a portion of the satellite of FIGURE 1.
Figure 6:
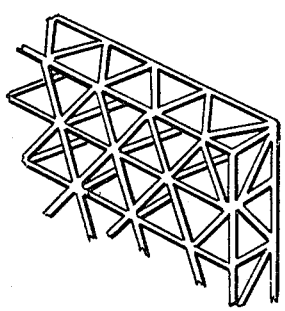
FIGURE 6 is an enlarged view of a portion of the satellite shown in FIGURE 5.
Figure 5:
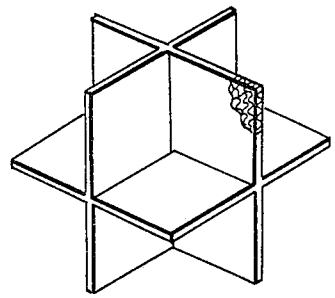
FIGURE 5 is a perspective view of another satellite construction in accordance with this invention.

The open network array of the satellite may take many shapes and sizes. By way of example, a 405-foot geodesic array is contemplated. The geodesic sphere is expected to be an isotropic reflector (FIGURES 1 and 2). However, a tri-planar non-isotropic reflector could be fabricated using the proposed module technique (see FIGURES 5 and 6). Lenticular or corner reflector designs are also possible. Although orientation might become somewhat of a problem in a non-spherical shape, there is no apparent limitation on the shape or the reflecting characteristics achievable with a module construction technique.

A structural redundancy (e.g., of 2.5) is deemed advisable for the following reasons:

(a) The shape of the sphere would be stabilized with redundant strength members (modules) as a result of the comparative thickness of the externally disposed tubes as opposed to thin outer skin of a balloon or the shell thickness feature;

(b) Structural problems from the failure of any one module either to inflate or to over inflate, would be adverted;

(c) The "thicker" matrix would be expected to improve electromagnetic reflection characteristics; and (d) It would serve as a protection against the hazards of space.

Producing the modules for a geodesic design could be accomplished in a number of ways. The basic ⅓ mil aluminum tape would be strengthened by a backing carrier and then slit and fed into the braiding machine of the character used in the braiding of electrical cable coverings and the like to produce a braided tubular structure. After braiding, the backing would be removed through heat and each joint of the aluminum would be cold welded for continuous electrical conductivity. Simultaneously, the basic polyethylene fabric would be sealed in a continuous tube, 1 in. diameter, fed into the "joining" machine where the aluminum braid and polyethylene tube mated by inserting the polyethylene tube in the tubular aluminum braid. Subsequently, the composite material is cured. As the continuous module tube material is drawn from the curing process, it is rolled on a storage drum.

To produce a basic module, the material would be unwound from the storage drum, cut to length, filled with sublimating powder 14 and the ends sealed. Six such units would be joined at one end into the basic, spatially orientable, building block; the joining angle would depend upon the specific design desired. This basic building block unit would also include redundancy elements if required in the specific application.

A preferred operational technique with the present invention involves launching and inflating the satellite on the dark side of the earth, the aluminum being elongated beyond its yield strength upon reaching a certain altitude. When the satellite reaches sunlight, the aluminum would already have received its permanent set and the super thin polyethylene film would be allowed, to melt. This results in a plastic film around the aluminum grid members. The net result is that the aluminum network would be the only principal surface area to receive solar wind pressure or be affected by aerodynamic drag. This construction would also eliminate satellite damage from ultraviolet radiation and correspondingly increase the life expectancy of the satellite.

Both the ⅛ in. spacing to be used in the braiding process and the cold welding of all joints are dictated by electromagnetic reflection considerations. The geodesic sphere is expected to reflect radar wave lengths with no difficulty. Since a 405-foot diameter geodesic satellite can be packaged in the same volume and weight required for a 135-foot solid satellite, a 10 db increase in signal strength is theoretically achievable because of size.

The geodesic sphere with 2½ redundancy is expected to have a reflectivity very nearly those values obtained by Lincoln Laboratory and Bell Telephone Laboratories for Echo I (NASA TN D–115). Thus, the radio cross section should be significantly better for this larger satellite.

It is contemplated that the reflective capability of the present satellite unit could possibly be improved by covering the large triangular voids with a radio cross section grid. This could be accomplished without adding very much weight since a radio cross section grid does not have to have any structural capacity. A grid formed by vapor depositing aluminized coatings on non-metallic fibers such as polypropylene, Dacron, nylon or Fiberglas would be suitable. An exemplary grid of this character is shown across several of the triangular openings in FIGURE 2. Such a grid with spacings on the order of 1/10 to 1/8 inch would be low in weight and would insure complete reflective response.

What is claimed is:

1. A satellite unit comprising:
   (a) a plurality of elongated modules,
   (b) said modules being interconnected in the form of a generally open network array,
   (c) each of said modules being generally tubular and having walls of inflatable plastic material,
   (d) at least a substantial proportion of said modules having metallic elements disposed about its longitudinal axis,
   (e) said metallic elements being interconnected.

2. A satellite according to claim 1 wherein said plastic is polyethylene.

3. A satellite according to claim 1 wherein said metallic element is aluminum wire.

4. A satellite according to claim 1 wherein said metallic element is braided aluminum tape.

5. A satellite according to claim 1 wherein said plastic is polypropylene.

6. A satellite according to claim 1 wherein the voids between the elongated modules of the satellite are spanned or substantially covered with a radio cross section grid.

7. A satellite unit according to claim 6 wherein said radio cross section grid is composed of non-metallic fibers such as polypropylene, Dacron, nylon or Fiberglas containing vapor deposited aluminized coatings.

8. A satellite according to claim 1 wherein said plastic, being heated by the rays of the sun, has melted.

References Cited by the Examiner
UNITED STATES PATENTS

| | | | |
|---|---|---|---|
| 3,152,329 | 10/1964 | Lowery | 343—18 |
| 3,153,235 | 10/1964 | Chatelain | 343—18 |
| 3,184,742 | 5/1965 | Cutler | 343—18 |

CHESTER L. JUSTUS, *Primary Examiner.*

G. M. FISHER, *Assistant Examiner.*